United States Patent
Rao et al.

(10) Patent No.: US 10,127,434 B2
(45) Date of Patent: Nov. 13, 2018

(54) TECHNIQUES FOR BUILT ENVIRONMENT REPRESENTATIONS

(71) Applicants: Manjuprakash Rama Rao, Chikkalsandra (IN); Rambabu Chinta, Mahadevpura (IN); Surajit Borah, Doddakannalli (IN)

(72) Inventors: Manjuprakash Rama Rao, Chikkalsandra (IN); Rambabu Chinta, Mahadevpura (IN); Surajit Borah, Doddakannalli (IN)

(73) Assignee: Tyco Fire & Security GmbH (CH)

( * ) Notice: Subject to any disclaimer, the term of this patent is extended or adjusted under 35 U.S.C. 154(b) by 115 days.

(21) Appl. No.: 15/211,271

(22) Filed: Jul. 15, 2016

(65) Prior Publication Data
US 2018/0018502 A1   Jan. 18, 2018

(51) Int. Cl.
| G06K 9/00 | (2006.01) |
|---|---|
| H04W 4/02 | (2018.01) |
| H04B 10/114 | (2013.01) |
| G06T 15/10 | (2011.01) |
| G06K 9/62 | (2006.01) |
| H04N 13/271 | (2018.01) |

(52) U.S. Cl.
CPC ....... *G06K 9/00201* (2013.01); *G06K 9/6202* (2013.01); *G06T 15/10* (2013.01); *H04B 10/1143* (2013.01); *H04N 13/271* (2018.05); *H04W 4/023* (2013.01); *H04W 4/026* (2013.01); *H04W 4/027* (2013.01); *G06T 2200/04* (2013.01); *G06T 2210/56* (2013.01); *G06T 2210/61* (2013.01); *G06T 2215/16* (2013.01)

(58) Field of Classification Search
CPC .. G06K 9/00201; G06K 9/6202; G06T 15/10; G06T 19/006; G06T 19/003; G06T 2210/56; G06T 2200/04; G06T 2215/16; H04W 4/023; H04B 10/1143; H04N 13/0271; H04N 13/271
USPC ........................................................ 382/154
See application file for complete search history.

(56) References Cited

U.S. PATENT DOCUMENTS

| 9,154,919 | B2* | 10/2015 | Yun | H04W 4/043 |
|---|---|---|---|---|
| 9,342,928 | B2* | 5/2016 | Rasane | G06T 19/006 |
| 9,778,626 | B2* | 10/2017 | Nixon | G06F 3/04842 |
| 2015/0054826 | A1* | 2/2015 | Varga | F41G 3/04 345/421 |
| 2017/0321923 | A1* | 11/2017 | Wiens-Kind | F24F 11/0086 |

* cited by examiner

*Primary Examiner* — Daniel Mariam
(74) *Attorney, Agent, or Firm* — Foley & Lardner LLP

(57) ABSTRACT

Described are techniques for indoor mapping and navigation. A reference mobile device including sensors to capture range, depth and position data and processes such data. The reference mobile device further includes a processor that is configured to process the captured data to generate a 2D or 3D mapping of localization information of the device that is rendered on a display unit, execute an object recognition to identify types of installed devices of interest of interest in a part of the 2D or 3D device mapping, integrate the 3D device mapping in the built environment to objects in the environment through capturing point cloud data along with 2D image or video frame data of the build environment.

16 Claims, 13 Drawing Sheets

Path Description (PD) File Format 70

| ID | | |
|---|---|---|
| #No of Positions, N | | |
| #Geo location in the map | | |
| Location [1]: | $X_1, Y_1, Z_1\ qx_1, qy_1, qz_1, qw_1$ | |
| | RSSI (1), #LiFi-enabled device location code (1) | |
| #Visual cues | $n_1$ | |
| Visual Cues: | $x_1, y_1, d_1$ \| $x_2, y_2, d_2$ \| .......... \| $x_{n_1}, y_{n_1}, d_{n_1}$ | |
| .......... | | |
| Location [N]: | $X_N, Y_N, Z_N, qx_N, qy_N, qz_N, qw_N$ | |
| | RSSI (N), #LiFi-enabled device location code (N) | |
| #Visual cues | $n_N$ | |
| Visual Cues: | $x_1, y_1, d_1$ \| $x_2, y_2, d_2$ \| .......... \| $x_{n_N}, y_{n_N}, d_{n_N}$ | |

$(X, Y, Z) \rightarrow$ Mobile device position
$(qx, qy, qz, qw) \rightarrow$ Quaternion (Transformation)
$(x, y) \rightarrow$ Visual cue spatial location in image
$(d) \rightarrow$ Description of visual cue
RSSI $(i) \rightarrow$ RSSI of WiFi/iBeacon at location $(X_i, Y_i, Z_i)$

FIG. 4

TECHNIQUES FOR BUILT ENVIRONMENT REPRESENTATIONS

BACKGROUND

This description relates to built environments and more particularly to representation of locations of devices and navigation through such built environments.

Recent advances in video and depth sensor technologies have been used to process sensor data into 3D maps that represent structure of a "built environment." Such 3D maps can be used in various applications.

Building information modelling (BIM) involves producing digital representations of physical and functional characteristics of such environments that are represented in BIM data. Building information modelling often assumes the availability of the location of the devices (assets) as part of BIM data.

SUMMARY

One application of 3D mapping as a representation of the built environment is for producing a layout of various items in the built environment. For example, in security/fire/intrusion alarm systems and surveillance systems such 3D mapping can be used for layout of sensor devices (assets) (e.g., smoke detectors, sprinklers, security cameras, conduits etc.) in the environment. Another application involves representing various devices used environment systems such as HVAC devices (assets) on 3D and 2D maps. Each of these applications as well as other can allow, e.g., technicians to navigate to specific devices to address maintenance issues.

According to an aspect, a system for indoor mapping and navigation includes a reference mobile device including sensors to capture range, depth and position data with the mobile device including a depth perception unit a position estimator, a heading estimator, and an inertial measurement unit to process data received by the sensors from an environment. The reference mobile device further includes a processor that is configured to process the captured data to generate a 2D or 3D mapping of localization information of the device that is rendered on a display unit, execute an object recognition to identify types of installed devices of interest in a part of the 2D or 3D device mapping, integrate the 3D device mapping in the built environment to objects in the environment through capturing point cloud data along with 2D image or video frame data of the build environment.

The following are some embodiments within the scope of the above aspect.

The system has the 2D or 3D object recognition is included in the 3D mapping process. The system has reference device models as images or 3D data models or Building information modelling (BIM) data. The processor is further configured to load RGB/RGB-D (three color+one depth) image/point cloud data set of a scene, choose interest points, compute scene feature descriptors, compare scene feature descriptors to descriptors of 3D models retrieved from a database of 3D models, and indicate objects recognized in the scene. Object recognition is manual object recognition or automatic object recognition. The processor is further configured to append the recognized device information along with its point cloud location with respect to a common reference point in a device information file or database or location server and associate the device information along with Li-Fi data stream if LED is inbuilt along with the recognized device. The processor is further configured to produce a unique identification code for each recognized device using the device information.

The processor is further configured to map installed devices of interest locations by the processor configured to determine the point cloud location of the installed devices of interest in the built environment, access scan data of the same built environment, and combine the point cloud location of the installed devices of interest with the scan data to obtain the 3D device mapping of the built environment. The processor is further configured to produce a unique identifier for the device with respect to a current 3D mapping using the device information by appending device type information contained in the device information, with the point cloud location and a Li-Fi data stream. The processor is further configured to partition the built environment into smaller regions, perform 3D mapping for each of the smaller regions; and stitch together resulting 3D mappings of the smaller regions with respect to a common reference to provide a complete 3D mapping of the built environment.

The processor is further configured to test the point cloud data and the 2D images or video frames to determine that as captured that both 2D data and the 3D point cloud are 1:1 correspondence. The system of claim 1, wherein the processor is further configured to test the point cloud data and the 2D images or video frames to determine that as captured that both 2D data and the 3D point cloud are 1:1 correspondence, when not in correspondence, align the point cloud data and 2D image or video frame for 1:1 correspondence or estimate an offset.

The processor is further configured to bind an identifier of installed devices of interest to a respective device in the message brokers by associating a logical device object with each of the device identifiers to enable application programs to access the device objects through services associated with the objects. The installed devices of interest are identified manually with an application that generates a graphical user interface tool rendered on a display device with a live feed from an RGB camera, provide a pointer and device type icons in the graphical user interface, receive a selection of a device is selected, save 3D point cloud data corresponding to the selection of the device made with the pointer tool, and receive an indication of a selected icon that is manually associated with the selected device.

Other aspects include methods and computer program products.

One or more aspects may provide one or more of the following advantages.

The aspects use an approach in which 3D point cloud data and object recognition are used to associate devices "in location" in the 3D point cloud data captured during a process of producing a 3D map of the built environment. The mapping process can use a handheld device, e.g., a tablet computing device that provides RGB-D information of the surroundings as well as 3D location information with respect to a known reference position to capture the 3D locations of various assets (devices). Aspects integrate 3D scans of environments along with the 3D location map of the devices produced by a different sensor (different process) such that a single 3D map of the environment along with the device locations is provided. Aspects in the process of mapping device locations and navigation aspects enable rich location aware applications with-in indoor spaces.

The details of one or more embodiments of the invention are set forth in the accompanying drawings and the description below. Other features, objects, and advantages of the invention is apparent from the description and drawings, and from the claims.

DESCRIPTION OF DRAWINGS

FIG. 4 is a diagram depicting a path description file format.

DETAILED DESCRIPTION

Figure 1:
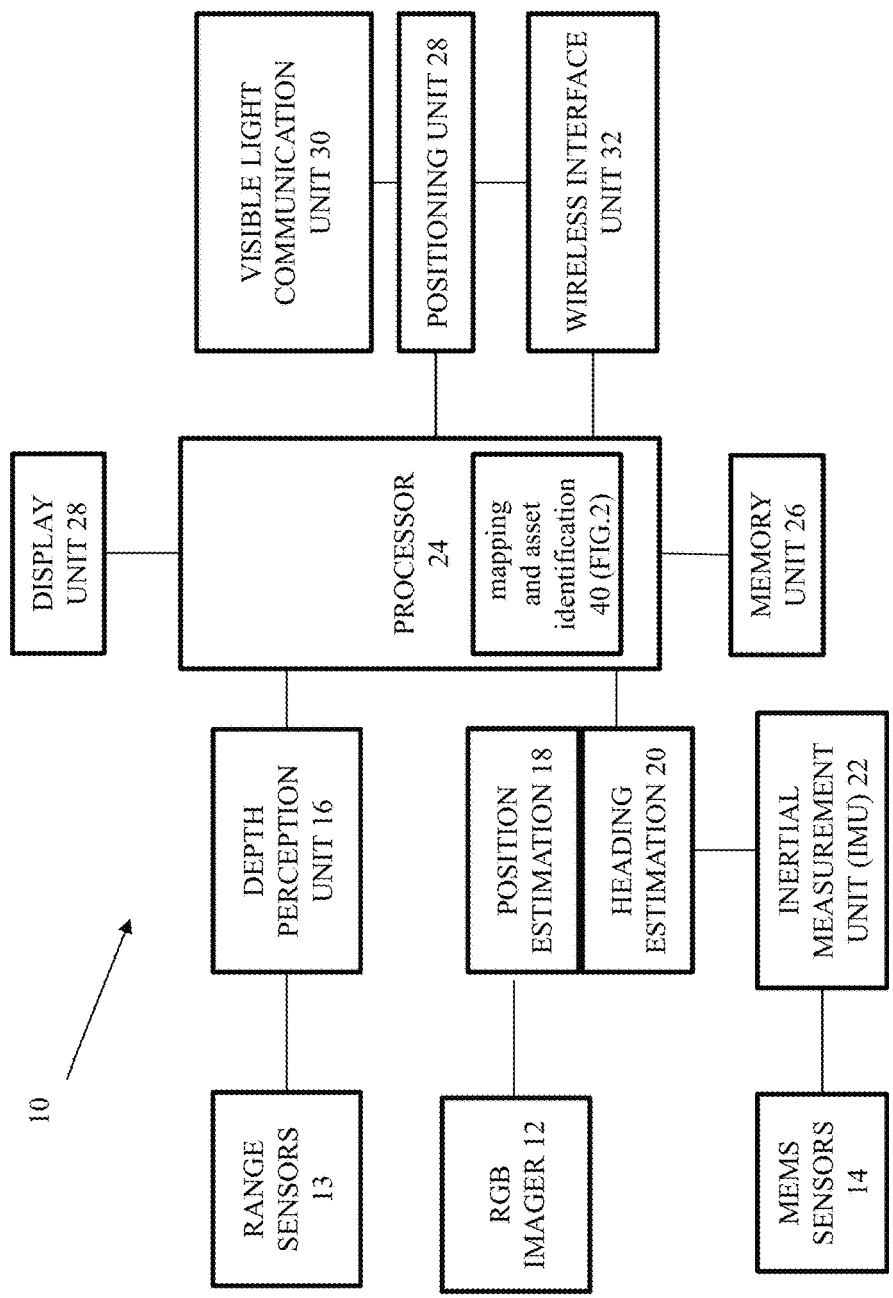
FIG. 1 is a block diagram of a reference mobile device for indoor mapping and navigation.

Referring now to FIG. 1, a reference mobile device 10 for indoor mapping and navigation 10 is shown. The reference mobile device 10 includes an RGB imager 12 and a range sensor 13. In this implementation the RGB imager 12 and range sensor 13 are two separate devices. A range (or depth) computation uses techniques such as time of flight or structured light sensors. While not commonly available in some smartphones, others such as Google Tango® tablet is an example where-in such a provision is available. Another example is a structured sensor that when attached to a smartphone can provide capabilities of providing depth information of the surroundings. The mobile device 10 also includes MEMS (microelectromechanical system) sensors 14, a depth perception unit 16, a position estimator 18, a heading estimator 20, and an inertial measurement unit (IMU) 22. The reference mobile device 10 also includes a processor device 24, memory 26 coupled to the processor device 24 and a display unit 26.

The reference mobile device 10 also includes a positioning unit 28, as well as a Li-Fi 30 and Wi-Fi (or other wireless interface unit 320. While Wi-Fi is commonly found in handheld devices such as smartphones, Li-Fi is not. For LiFi an adapter, e.g., a dongle can be used provisioned. Alternatively, the regular RGB image sensor can be configured to receive the modulated light from nearby Li-Fi sources.

The processor 24 in the reference mobile device 10 executes an asset identification process 40 (FIG. 2) that provides an efficient mechanism to represent assets on 3D or 2D maps and subsequently make use of the location information for location based interactive applications. Servers (not shown) could execute portions of or all of the process 40. In some implementations the asset identification is "map based." However, the asset identification need not be a "map based" process. The processor 24 executes several other functions such as mapping of assets, navigation which is described below.

The reference mobile device 10 maps various installed devices of interest (or assets) such as fire protection and suppression devices (for example smoke detectors, sprinklers etc.), surveillance cameras, HVAC equipment and other building management system installed devices of interest with-in a "built environment." A "built environment" is used to delineate a physical structure, such as a building that is built, i.e., constructed, and that has in place various installed devices of interest (assets). The asset identification process 40 (FIG. 2) efficiently maps the locations of these installed devices of interest (assets) and can be used to navigate to these installed devices of interest for purposes of service and maintenance.

The data acquired by RGB imager 12 and a range sensor 13 and MEMS sensors 14 are processed by the heading estimator 20 and the position estimator 18 and such data are processed by the processor 24 to generate localization information of a device that is rendered as an image on the display unit 28 of device 10. The device 10 can be a personal digital assistant (PDA), smart phone, or tablet computing device, or other processor containing device/system and executes the process 40 including visual simultaneous localization and mapping (SLAM) algorithms that may include an extended Kalman filter.

Visual SLAM algorithms are commonly found in robotic mapping applications, and address a computational problem of constructing or updating a map of an unknown environment while simultaneously keeping track of an agent's location within that environment. There are several algorithms known for providing at least approximate solutions to such a tracking problem. One such approximate solution method involves the extended Kalman filter that keeps track of an estimated state of a mapping and a variance of the estimate.

Visual SLAM based techniques make use of identifying certain unique landmark features in successive video frames. Paths are learned by recording the motion information from IMU (Inertial Measurement Unit) 22 having an accelerometer and gyroscope) and subsequently the information is used to assist in navigation of learned paths. Visual feature points can also be recorded and stored (as area definition files) and can assist in improved navigation. The device 10 captures additional attributes derived from BLE (Bluetooth low energy) or Li-Fi (Light Fidelity bidirectional, high speed and fully networked wireless communication technology) beacons that can provide information about the location of the device 10. The previously learned paths can be loaded and referenced by the navigation application.

The depth perception unit 16 provides a set of data points, e. g., a point cloud data set of an environment that are determined from point locations derived from range sensing. The processor 24 is coupled to data input from positioning unit for location estimation based on (Li-Fi) 32 or wireless interface 30 (Bluetooth transceiver, Wi-Fi or other RF location technologies). Memory 26 can provide storage for commands used by processor in executing various algorithms as well as data storage corresponding to the mapping and navigation data generated by processor 24.

The built environment may be mapped using 3D scanners from companies such as Leica, Velodyne, Google (Tango®) tablet or other devices. The processor 24 uses these mappings as point cloud data sets from device 10 and identifies in the point cloud data set, locations of the installed devices of interest with respect to a common reference point. Mapping may be accomplished manually or with robotic assistance using the handheld 3D scanning device. The output of the scanning process result in well-registered visual and/or 3D point cloud representations of the built environment. Certain devices such as Google's Project Tango has the capability to map the surrounding 3D space (built environment) and also the ability to compute and display the current location relative to a known starting location. The relative location is computed based on motion tracking from inertial motion unit as well as motion estimated from SLAM using video input.

Figure 2:
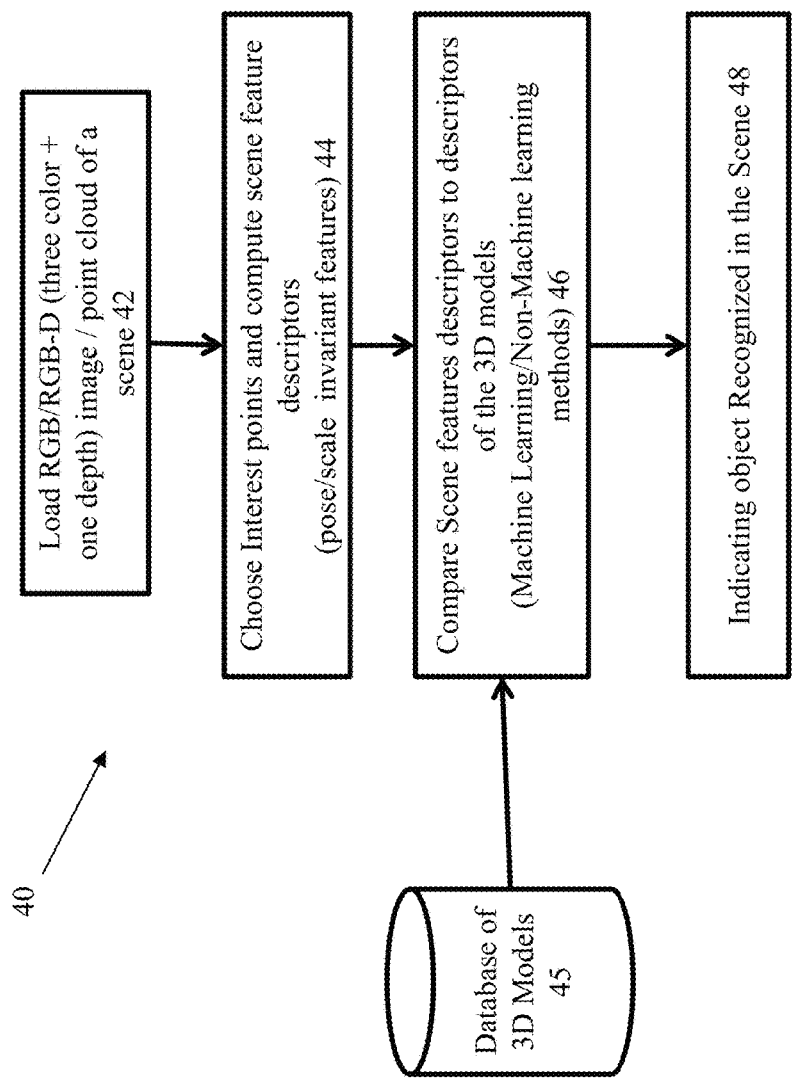
FIG. 2 is a flow diagram for a process for 2D/3D Object Recognition.

Referring now to FIG. 2, the asset identification process 40 to identify the types of installed devices of interest (smoke detectors, sprinklers, security cameras) in the represented data as a part of 3D device mapping process is shown. A 2D or 3D object recognition technique can be included in the 3D mapping process. In one of the approaches of object recognition, algorithms are executed in order to identify the device type automatically and map the location of the installed devices of interest in the 3D model.

The reference device models, which could be images or 3D data models or BIM data, may be input from the bill of materials used in the building. The process 40 includes loading 42 RGB/RGB-D (three color+one depth) image/ point cloud data set of a scene, choosing 44 interest points and compute scene feature descriptors (pose/scale invariant features), and comparing 46 scene feature descriptors to descriptors of 3D models retrieved from a database 45 of 3D models, using either machine learning and/or non-machine learning methods. The process 40 also includes indicating 48 objects recognized in the scene.

Figure 3:
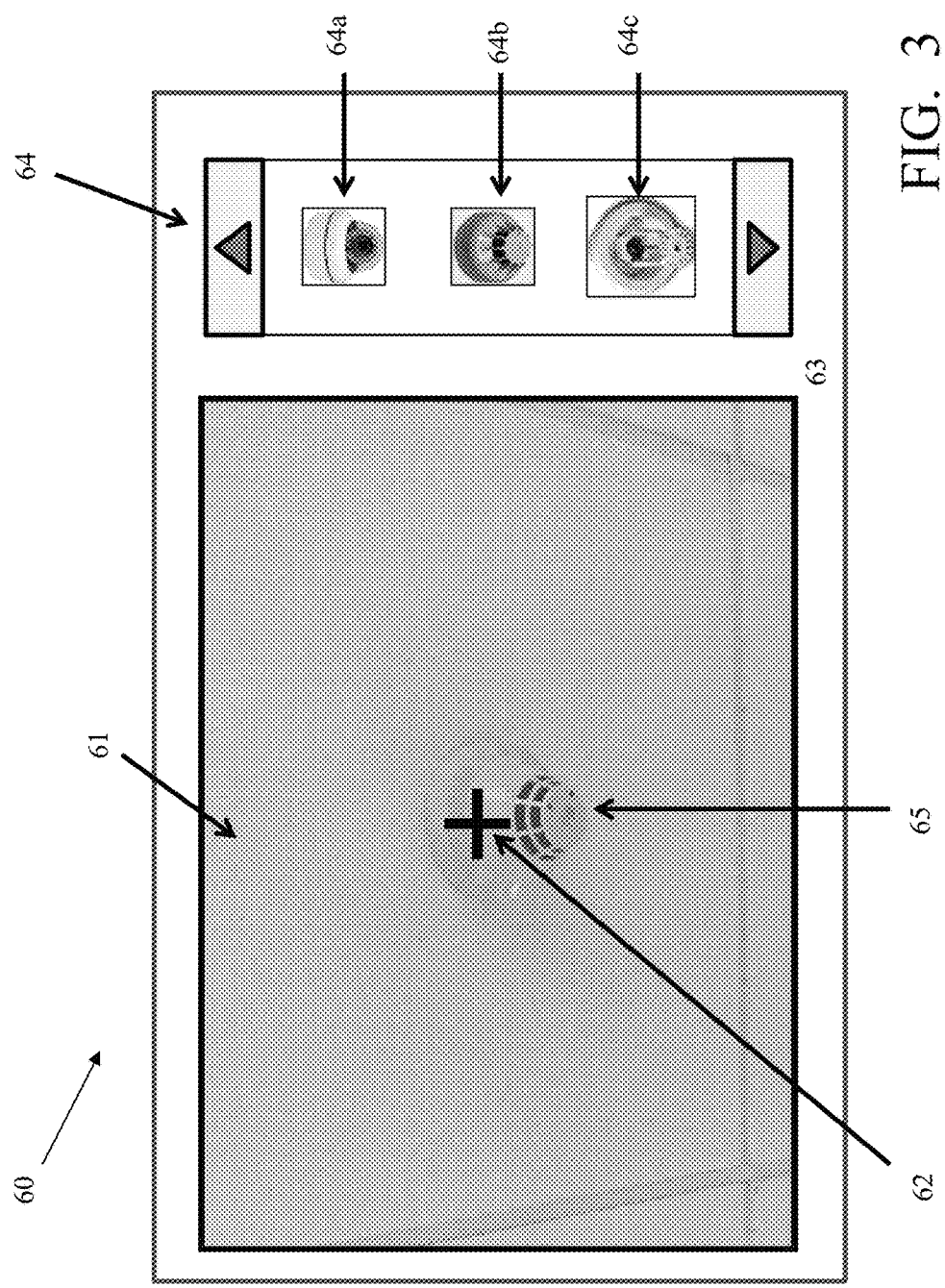
FIG. 3 is a diagram depicting an example graphical user interface for manual device identification in 3D mapping process.

Referring to FIG. 3, in an alternative approach 60, the installed devices of interest may be identified manually and captured in the location of the installed devices of interest in the 3D maps. An application may support graphical user interface (GUI) tools (as rendered on a display device 63) in order to identify the type of installed devices of interest manually. For example, a GUI 61 is rendered on a display 61 that renders, e.g., a live feed from an RGB camera. The GUI provides a pointer tool 62 and device type icons 64 (a camera 64a, smoke detector 64b and sprinkler 64c icons are shown) in order to select the installed device of interest, as shown. When an installed device of interest is selected, the 3D point cloud data corresponding to the pointer tool is saved. The pointer may be a group of pixels in the video frame or image of the installed device of interest. In the example shown in FIG. 3, the user points the pointer tool 62 at a smoke detector 65 mounted in the ceiling of a built environment and clicks the smoke detector icon 64b to map the smoke detector into the 3D mapped data (by capturing the 3D point cloud data corresponding to the pointer tool along with the selected icon.

Referring now to FIG. 4, an application may learn a path from a known starting indoor location to a mapped installed device of interest based on the data from the IMU 22, visual SLAM, Li-Fi 30 or wireless beacons 32 (e.g., Wi-Fi, low energy Bluetooth, etc.). A 2D or 3D map of the representation including the location of the installed devices of interest and learned path would be saved to be used for navigation purposes. An example of a file format 70 that may be used for producing such a path description (PD) file includes a header 74 with metadata that includes, for example, identification (ID) 72, the 'N' number of positions and the global position in the given map. Also included in the file format is a data block 76 that provides location information (position, transformation, receiver signal strength indication (RSSI), location code from Li-Fi-enabled devices) of path and a data stream of visual cues (edges, corner points, etc.) of the scene, arranged from 1 to N. Such a PD file may be referenced for both path visualization and drift correction during the navigation process. There may be different approaches of objects mapping process in 3D point cloud data. In one approach, the objects may be mapped into the 3D point cloud data on the fly. In another approach, the objects may be mapped offline. In both of these approaches there may be automatic or manual object recognition processing.

Figure 5:
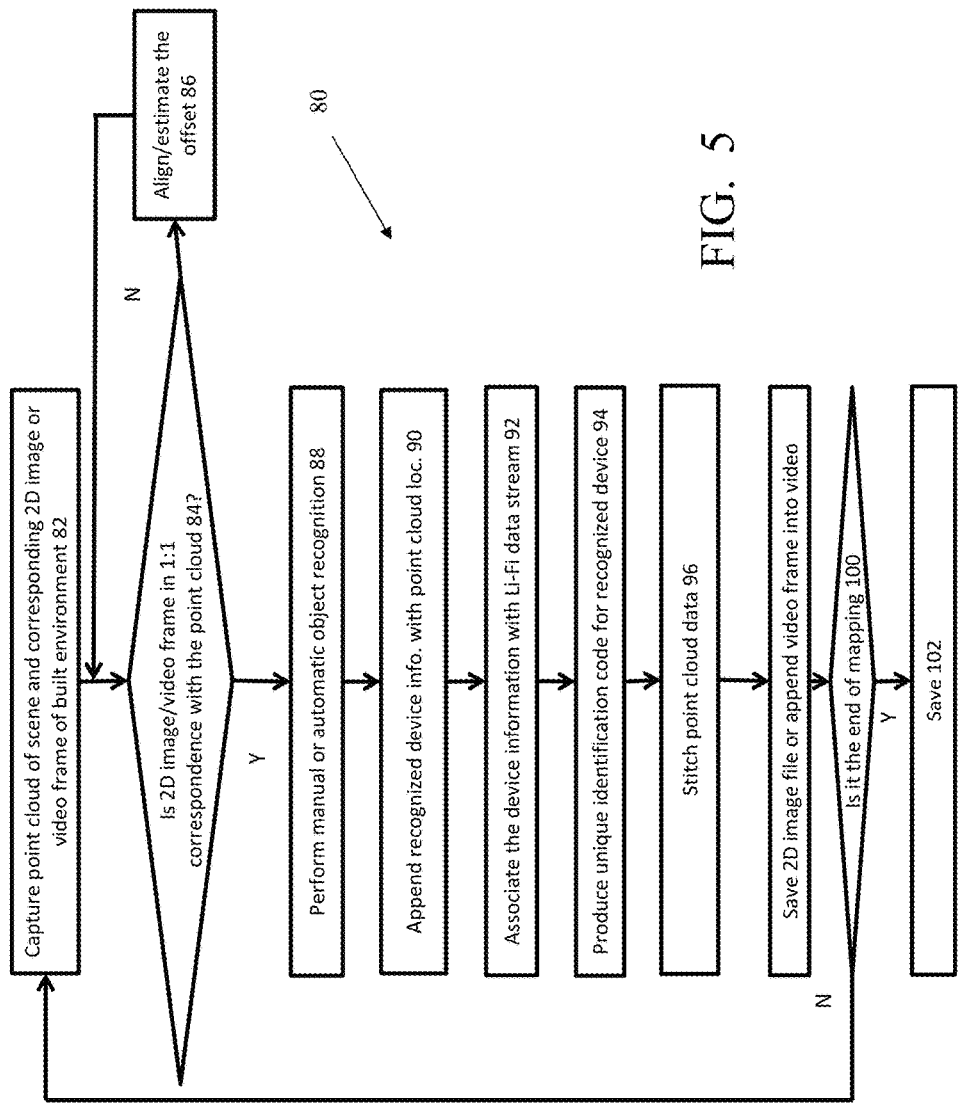
FIG. 5 is a flow diagram for a process of integrated 3D device mapping in the built environment.

Referring now to FIG. 5, a process 80 for integrating a 3D device mapping in the built environment, has the objects being mapped as the installed devices of interest are encountered. The process 80 starts by capturing 82 the point cloud data along with 2D image or video frame of the build environment as shown. The point cloud data and the 2D images or video frames are tested 84 to determine that as captured both 2D data and the 3D point cloud are 1:1 correspondence. If they are not, the process aligns 86 3D point cloud of scene and 2D image or video frame for 1:1 correspondence or estimate the offset between them. The offset between the 3D point cloud of scene and 2D image or video frame is estimated so that the offset can compensate any misalignment of object location in the point cloud data. In another words the vertices at location for example (x, y) of the 3D image corresponds to the color pixel at location (x, y) in the 2D image.

The process performs either a manual or an automatic object recognition in point cloud data or 2D image or video frame (if there is a static device of interest present). The process appends 90 the recognized device information along with its point cloud location with respect to a common reference point in a device information file or database or location server and associates 92 the device information along with Li-Fi data stream if LED is inbuilt along with the recognized device. The process 80 produces 94 a unique identification code for each recognized device using the device information. The process stitches 96 the point cloud data (using registration) with overlapping areas of current and previous point cloud data reduced to thresholds and saves 98 the 2D image file or appended video frame into video. The process determines if this is the end of mapping 100 and if not returns to capture point cloud of scene otherwise, save 102 the stitched point cloud data and object information (type and 3D location) file or database or location server data.

Figure 6:
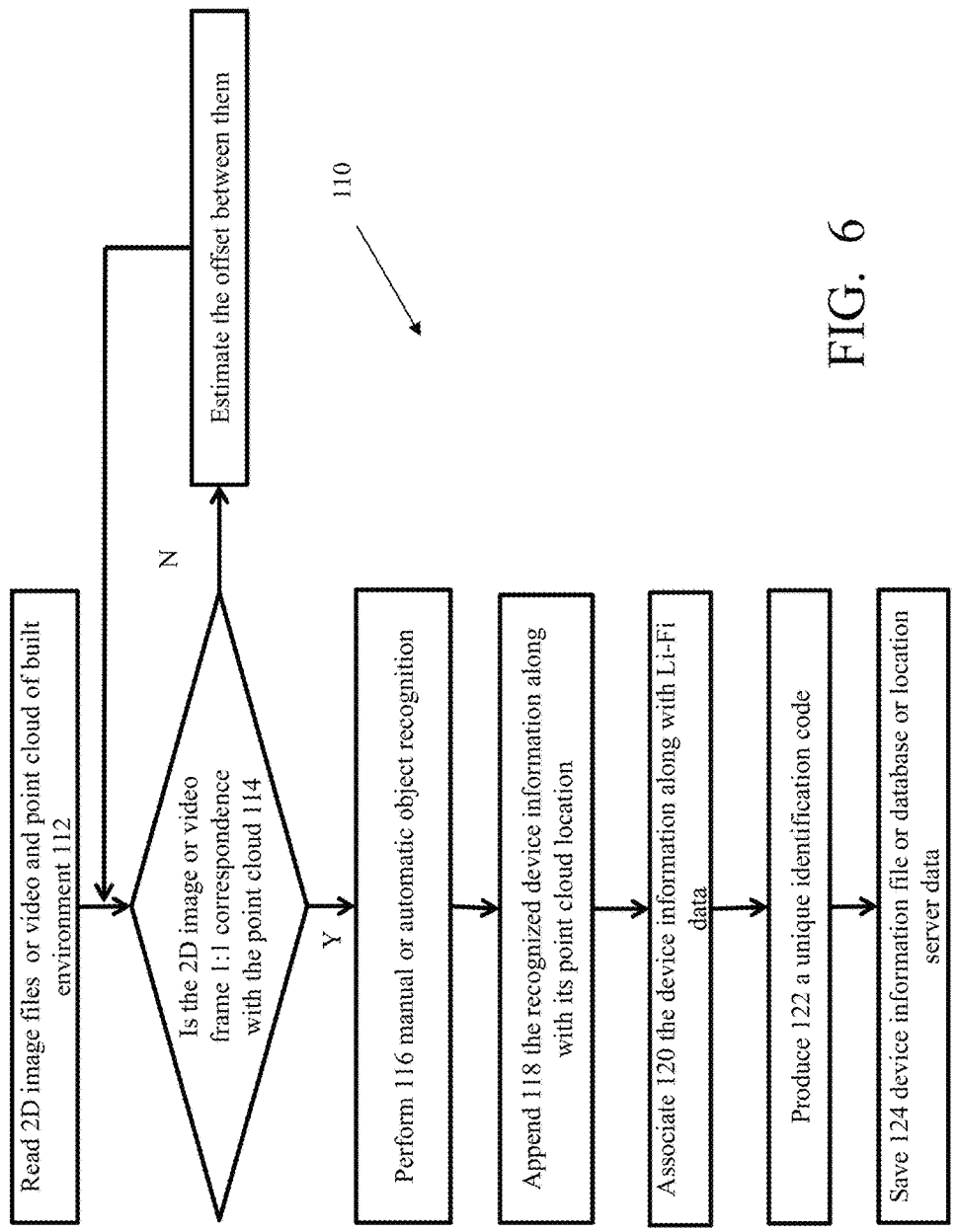
FIG. 6 is a flow diagram for a process of 3D device mapping in the built environment (offline).

Referring now to FIG. 6, in another approach an offline 3D device mapping process is used. In this approach, 2D image files or video and point cloud of the built environment, which were already saved in some other process are read. Offsets between the 3D point cloud of scene and 2D image or video frame are estimated so that the offset can compensate any misalignment of object location in the point cloud data.

The subsequent steps are similar to the steps described in the previous process as in FIG. 5. Thus, the manual or automatic object recognition is performed on point cloud data or 2D image or video frame if there is a device of interest present. The process appends 118, the recognized device information along with its point cloud location with respect to a common reference point in a device information file or database or location server and associates 120 the device information along with Li-Fi data stream if LED is inbuilt along with the recognized device. The process produces 122 a unique identification code for each recognized device using the device information and saves 124 device information file or database or location server data.

In an alternate approach, the mapping of the installed devices of interest locations may involve combining outputs from two distinct processes. In one of the processes, the point cloud location of the installed devices of interest in the built environment are determined. In the other process, 3D scan of the same built environment is performed. The output of both these processes are integrated to obtain the 3D device mapping of the built environment. The integration requires point cloud registration of the device locations and scanned point cloud data.

The device type and the point cloud location of the device are considered as device information. A device may also be associated with device information along with Li-Fi data stream if LED is inbuilt along with the device of interest. In one of the instances the 3D mapping process one may produce a universally unique identifier (UUID) or unique identifier (UID) of each device with respect to a current 3D mapping using the device information. For example if 'M' is the device type information contained in the device information, "x, y, z" is the point cloud location and 'i' is a Li-Fi data stream, then the UUID or UID could be produced by combining these values.

Figure 7:
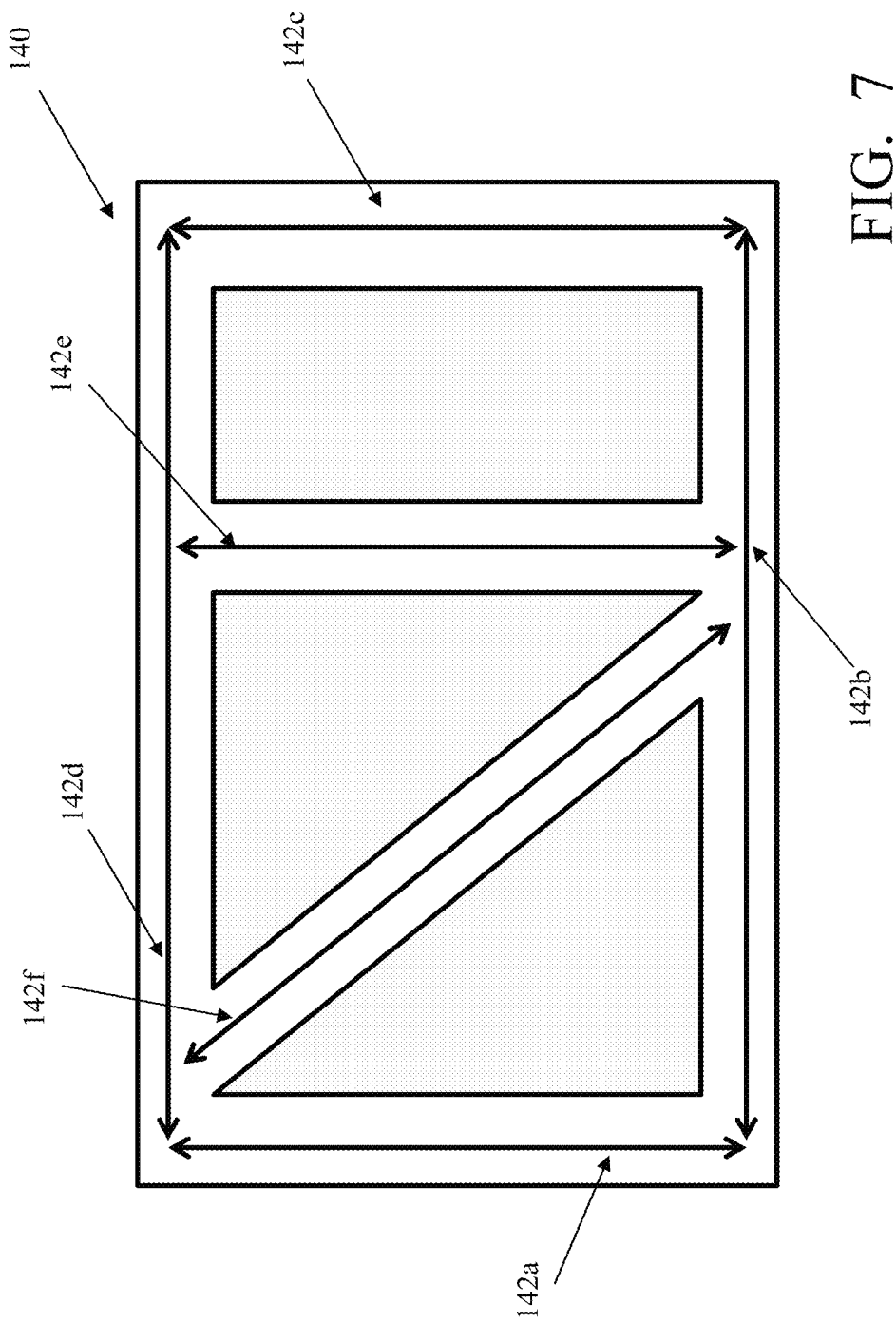
FIG. 7 is a flow diagram for a process of 3D device mapping in the built environment by dividing a large built environment into several smaller parts.

Referring now to FIG. 7, another approach 140 to accomplish the 3D device mapping of a built environment, especially when the built environment is large, is to divide the built environment into smaller regions and perform 3D mapping for each of the smaller regions. These 3D mappings of the smaller regions are stitched together with respect to a common reference to provide a complete 3D mapping of the whole built environment. In FIG. 7, an example of this approach has walking paths of a built environment divided into six smaller paths 142a-142f. The 3D mapping is performed for each individual one of the smaller paths 142a-142f and these paths 142a-142f can be stitched to obtain the 3D mapping of the entire built environment. Apart from mapping of installed devices of interest, landmarks, such as exit or entry signs of the built environment or any other fixed and prominent landmarks may also be mapped. The mapping of such landmarks may be used during navigation process to localize the mobile device 10 with respect to the landmarks.

Figure 8:
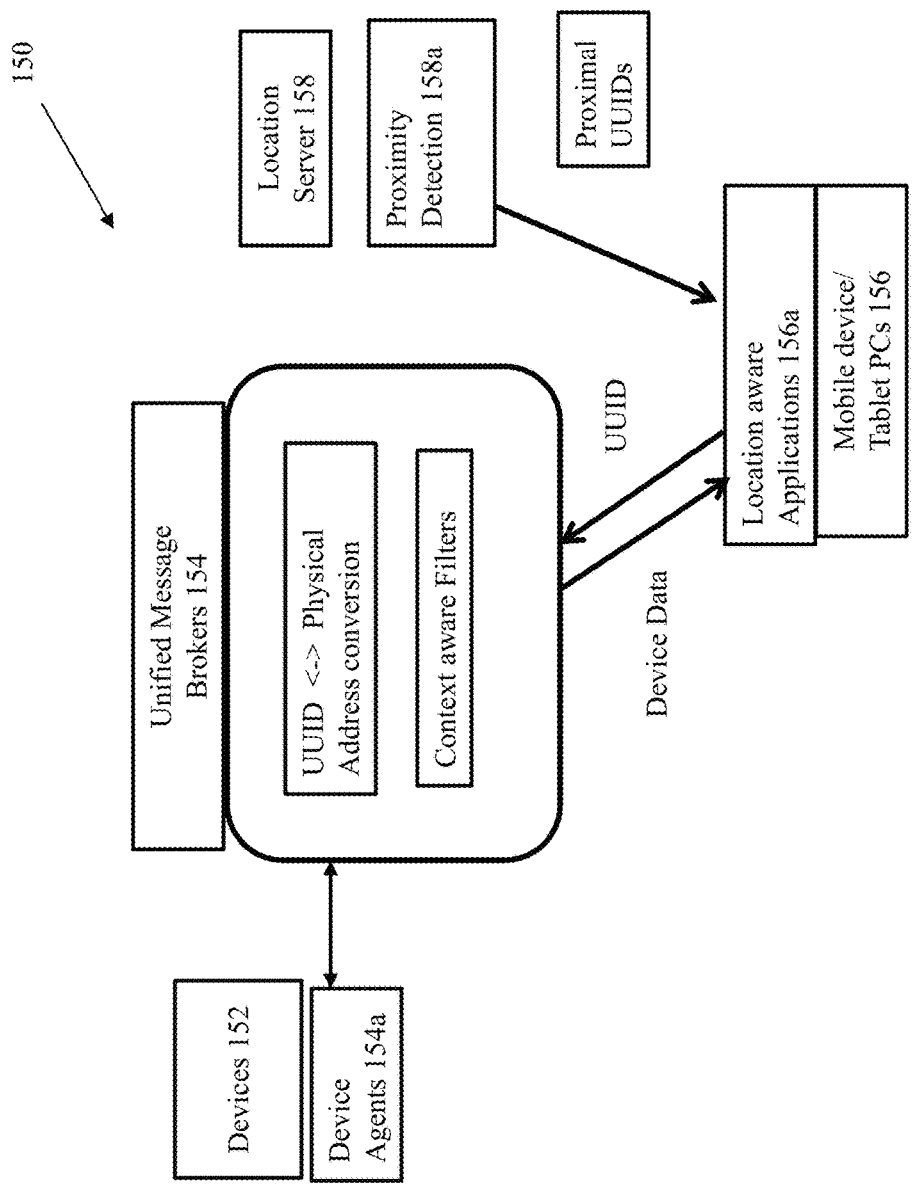
FIG. 8 is a conceptual view of commissioning of a location aware application.

Referring now to FIG. 8, various functional blocks are shown for a commissioning system 150 to develop interactive location aware applications. As shown, there are devices generally 152 that have device agents 152a, message brokers 154 that provided UUID to physical address conversion and context aware filters. The system 150 also includes the mobile devices generally 156 that execute the location aware applications 156a and location servers 158 that perform proximity detection 1548a.

There may be various categories of installed devices of interest installed in buildings for the purpose of safety, security and comfort. Smoke detectors, sprinklers, cameras, HVAC etc., are some of the examples of such installed devices of interest. Different types of installed devices of interest might be connected using different types of wired and wireless communication networks. For instance, smoke detectors could be connected using a serial communication protocol such as MODBUS, cameras may be connected using a TCP/IP network, HVAC devices may be connected using the so called BACnet communications protocol.

However, so long as each of the installed devices of interest are networked, each of the installed devices of interest can be uniquely addressed on the respective network and respective device controllers thus query and gather operational data from such installed devices of interest. Device ontologies might differ for different types of installed devices of interest. In order to build interactive location aware applications, the proximity of a user to these installed devices of interest is detected and the required information is provided to the application. The applications will have to be aware of device addresses and the data access protocols to be able to query the required information.

The process of commissioning binds the UUID or UID of installed devices of interest 152 to the respective device in the message brokers 154. The device agents 152a may reside on the device 150 itself or in controllers or aggregation gateways or cloud servers. A logical device object will be associated with each of the installed devices of interest identified by UUID or UID. The application programs access the device objects through the services associated with the objects. The services might differ based on device categories. The device agents or message brokers may filter the data based on application context.

Detection of proximity of mobile device 10 carried by users (service technician as an example) can be done by number of technologies such as motion tracking, Li-Fi, BLE, Wi-Fi, RFID, NFC etc. based parameters. The location server 158 may perform the function of proximity detection for the installed devices of interest. The location information of the installed devices of interest referenced by the UUIDs or UIDs may also be configured in the location server 158. Location aware applications can access the services provided by location servers 158 related to user proximity to the configured installed devices of interest. The applications may provide the UUID or UID information to the message brokers 154 and retrieve the device information and present the same on appropriate user interface.

Certain aspects of the innovation in the navigation process mentioned here may enhance the user convenience to navigate to the mapped installed devices of interest.

Figure 9A:
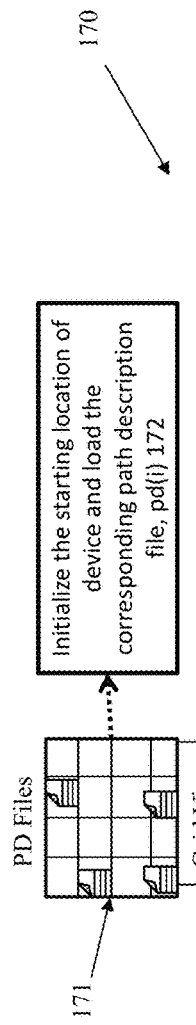
FIG. 9A depicts a grid view and a flow diagram for a navigation process for manual initialization.

Referring now to FIG. 9A shown is an initialization 170 of navigation process with user's provided inputs. The navigation process 170 is initialized 172 with the starting 3D location and orientation of the mobile device 10 and relative to the 3D model, and by loading the corresponding path description file, PD(i) (see grid view 171). The process 170 may rely on relative position of the mobile device 10 from known previously mapped object which is configured to transmit its 3D location using wireless technologies. It may be noted that the origin of 3D location (X1,Y1,Z1) can be uniquely mapped a known geolocation point and the XY plane is considered as the floor of the building.

Figure 9B:
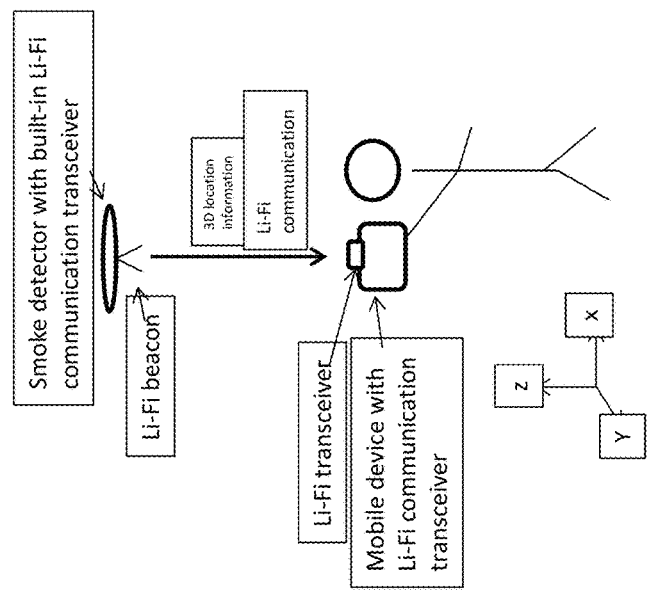
FIG. 9B is a diagram depicting the initialization process of navigation based on user interaction with a previously mapped device with Li-Fi communication capability.

Referring now to FIG. 9B shown is an example of a previously mapped smoke detector which has the capability to transmit its 3D location over a Li-Fi communication channel. The user launches the initialization application and stands directly under the smoke detector pointing the mobile device 10 such that the user can see the image of the smoke detector on the GUI and such that the Li-Fi transceiver has a direct line of sight to communicate with-in a narrow conical angle with the smoke detector. The user selects the image of the smoke detector on the GUI based on the RGB camera input. The application computes the distance "d" of the smoke detector from the mobile device 10 by processing the data in the depth map corresponding to the region selected on the GUI. The application computes the current position of the mobile device 10 by subtracting distance "d"

from the location X1,Y1,Z1 and determines X1,Y1, (Z1−d) as its 3D location with respect to the origin. Once the 3D location of the mobile device 10 is determined during the above initialization step, the PD files of the previously learnt paths which intersect with the current user location is automatically loaded by the application. As the user start to navigate along a path, the real time visual cues are compared with the visual cues in the already loaded PD file and a drift correction along with necessary GUI indication may be provided to the user.

Alternatively the user may extend the process involved in the example as shown in FIG. 9B by selecting at least two previously mapped objects 1 and 2, which are configured to transmit their 3D locations using wireless technologies, to initialize the mobile device 10 relative to the 3D model to start the navigation. The extended process may provide the user not only the location but also heading direction of the mobile device 10 relative to the 3D model. For computing the heading direction, the initialization application may track the direction of motion of the mobile device 10 as the user walks from object 1 to object 2. Subsequently based on the 3D locations of the selected objects, for example object 1 $(X_1,Y_1,Z_1)$ and object 2 $(X_2,Y_2,Z_2)$, the initialization application may compute the heading direction of the mobile device 10 relative to the 3D model. The initialization application may compute the 3D location of the mobile device 10 by using the 3D location of either of the two selected objects by using similar process as in the example as shown in FIG. 9B. This completes the process of initialization and the user who may start to navigate along a previously learnt path and the PD file, which is automatically loaded into the mobile device 10, would be used to provide the drift correction.

Figure 10:
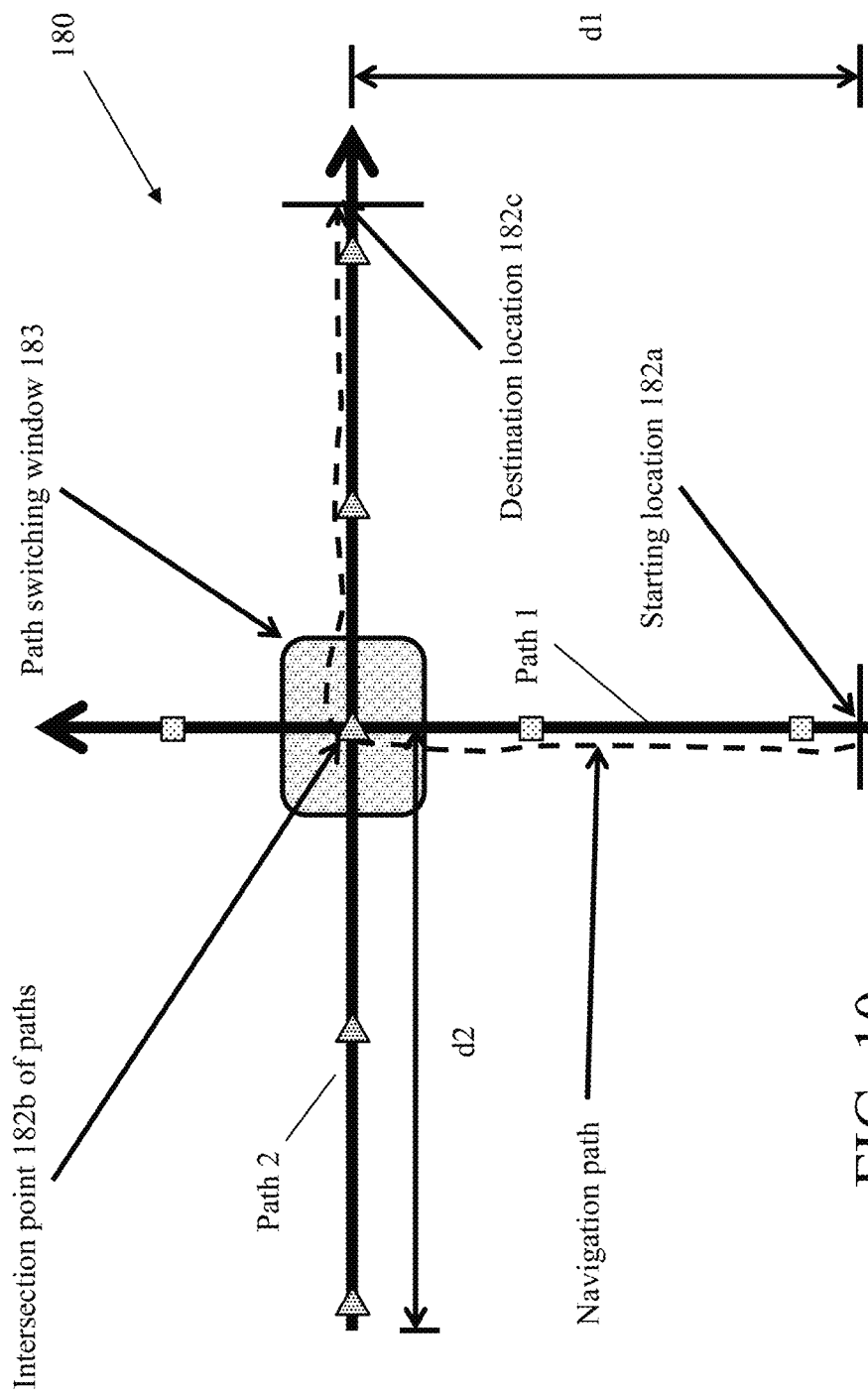
FIG. 10 diagram depicting path switching and drift correction during navigation process when starting and destination locations are on different paths.

Referring now to FIG. 10, path switching and drift correction during navigation when starting and destination locations are on different paths is shown. Two different paths (P1 and P2) comprising a navigation path for a mobile device 10 to navigate are shown. In this example, the mobile device 10 may refer the PD file of Path 1 during the navigation from the starting point 182a to the intersection point 182b and switch to the PD file of Path 2 during navigation from intersection point 182b to the destination point 182c. The mobile device 10 may search and load the corresponding PD file when the mobile device 10 is within the path switching window 183 and based on its real time differential IMU data exceeding a predefined threshold. As a validation step, the real time visual cues of the mobile device 10 may be compared with learned visual cues from PD file of path 2 within a narrow window (+/−distance d1) from d2. Following successful validation, the PD file of path 2 may be referenced for further navigation.

The navigation process uses the previously learned (during 3D mapping process) path description (PD) files to navigate from one location to another in the built environment. The navigation applications may render the learned paths as well as the current location of the mobile device 10 in order to guide the navigation process along the required path. However, the navigation path may be a single path, which has been learned previously, if both the starting and destination locations are on the same path. Otherwise the navigation path may be a combination of more than one path either in full or parts if the starting and destination locations are on different paths.

In one of the scenarios if both the starting location provided by the user and the destination are part of a single path description file then the user may begin navigation from the starting location and may follow the highlighted path to the destination. The corresponding path description file will be referenced during the navigation process, Comparison of the real time data parameters acquired by sensors with the data in the path description files and displaying the differences will provide visual cues to the users and control the drift while navigation along the path.

In another scenario, if the path to the selected destination comprises of portions of distinct paths learned earlier, then the application may track the current user location and detect if the user approaches the intersection of paths. The detection of the path intersection may be implemented in different ways. Since the optimal path is computed beforehand, the indoor global geo location of the intersection may be computed and real time location of users may be compared with the location of intersection and the user proximity may be detected. Alternatively detection of intersection may be detected comparing the real time receiver signal strength indication (RSSI), Bluetooth low energy (BLE) or Li-Fi parameters visual cues and compare with the parameters in the path description file.

The IMU data (roll, pitch and yaw) may detect user actions such as taking a turn at an intersection. Based on the direction of user motion, the application determine that the mobile device 10 is within a path switching window 183 and switch to the different path description file corresponding to the path taken by the user. A validation step may be performed by comparing the real time visual cues with those in the path description file. On successful validation the application may continue to reference the selected path description file.

Figure 11:
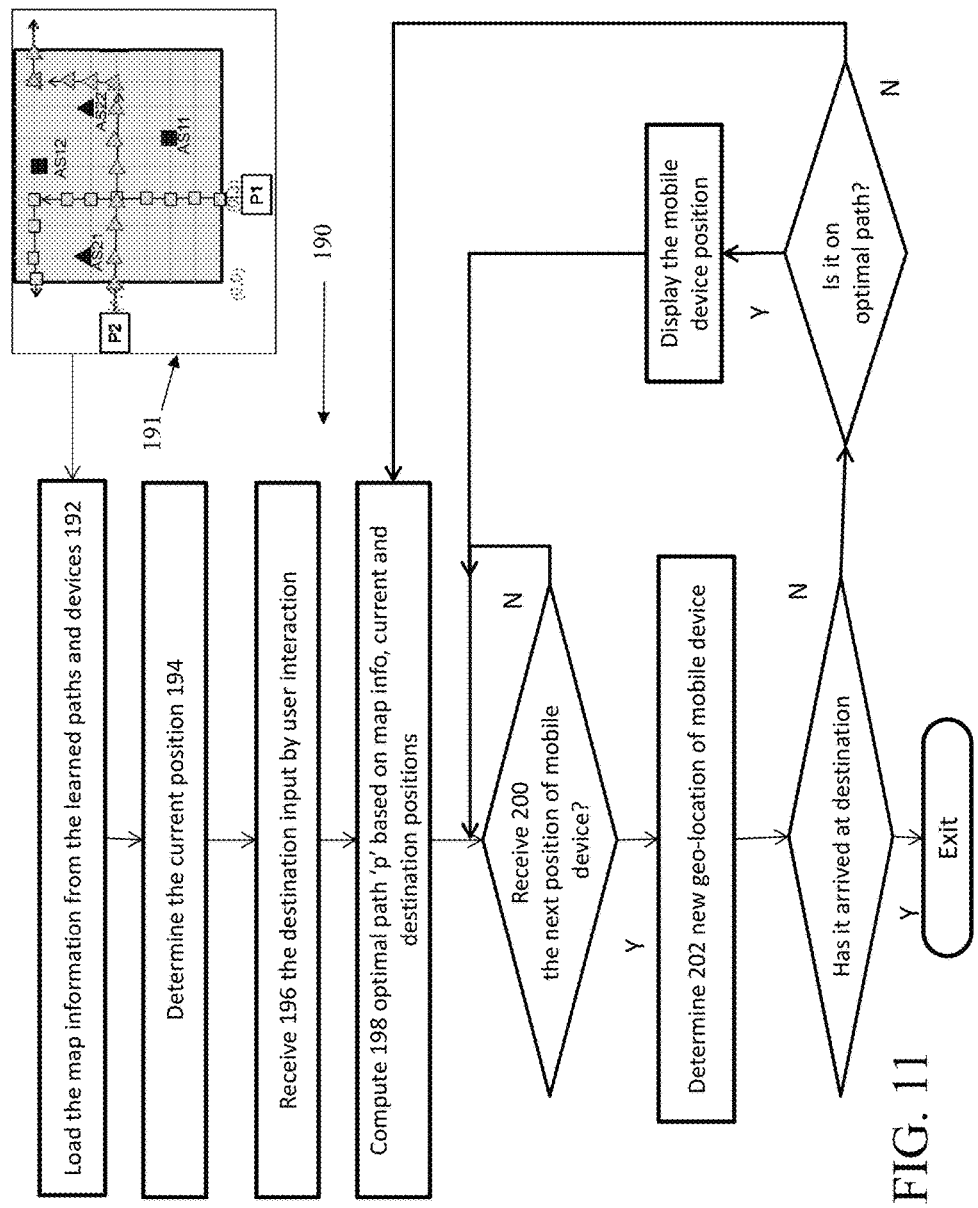
FIG. 11 depicts a grid view and a flow diagram illustrating the navigation process to compute path and navigate to the user selected destination.

Referring now to FIG. 11, navigation assistance provided to users may depend upon user preferences. The navigation process computes a path to a selected destination. In this process, when the user enters the building for the first time, the mobile device 10 receives 192 map information of learned paths (see grid view 191), installed devices of interest, and current location (starting position) based on manual/auto initialization, and displays the map information on display unit. The user may set a destination in the displayed map information through the search window or a method of clicking/touching the position on the map. The navigation mobile device 10 has a service to calculate and displays an optimal path based on the received map information, a current position, and the destination. The navigation mobile device 10 determines 194 the current position (starting position) by manual/automatic initialization. The navigation mobile device 10 receives 196 the destination input by user interaction. The navigation mobile device 10 computes 198 an optimal path 'p' based on map information, current position and destination position and displays the optimal path on the display. The navigation mobile device 10 waits to receive 200 the next position of mobile device 10 and determines 202 new geo-location of the mobile device 10 and tests if arrived at location 204. If so it exits. Otherwise, the process determines if it is on an optimal path 206, displays 208 the mobile device 10 position and receives 200 the next position.

While the user is moving according to the optimal path, the user may continuously observe a current position of navigation device and check his/her moving path on the mobile device. The mobile device 10 frequently determines whether the current position is destination. When the current position is not destination, the mobile device 10 determines whether the current position is on the optimal path. The mobile device 10 may inform the user of 'out of path' with a voice, text alerts, or an alarm indication. If the user deviates from the optimal path, then, the mobile device 10 re-calculates an optimal path from the current position to the destination comprising of entire or portion of one or more previously learned paths. Additionally the GUI may display the optimal path from the current position to the destination. Finally when the user arrives at the destination an indication is provided and the navigation process is completed. In another navigation approach, users may not select a specific destination. However they might require a visualization of all the paths and the installed devices of interest and they might take specific paths as deemed appropriate. As long as the users are navigating along previously learned path, the techniques described above would dynamically reference the appropriate PD files and implement drift corrections.

Additionally there could be other applications which may make use of spatial relationships of the installed devices of interest in order to improve the system efficiency. The locations of video cameras may also be a part of the 3D mapping process, From time to time video clips from the cameras may be captured and used to verify the alarm conditions of smoke detector or motion sensors etc.

Figure 12:
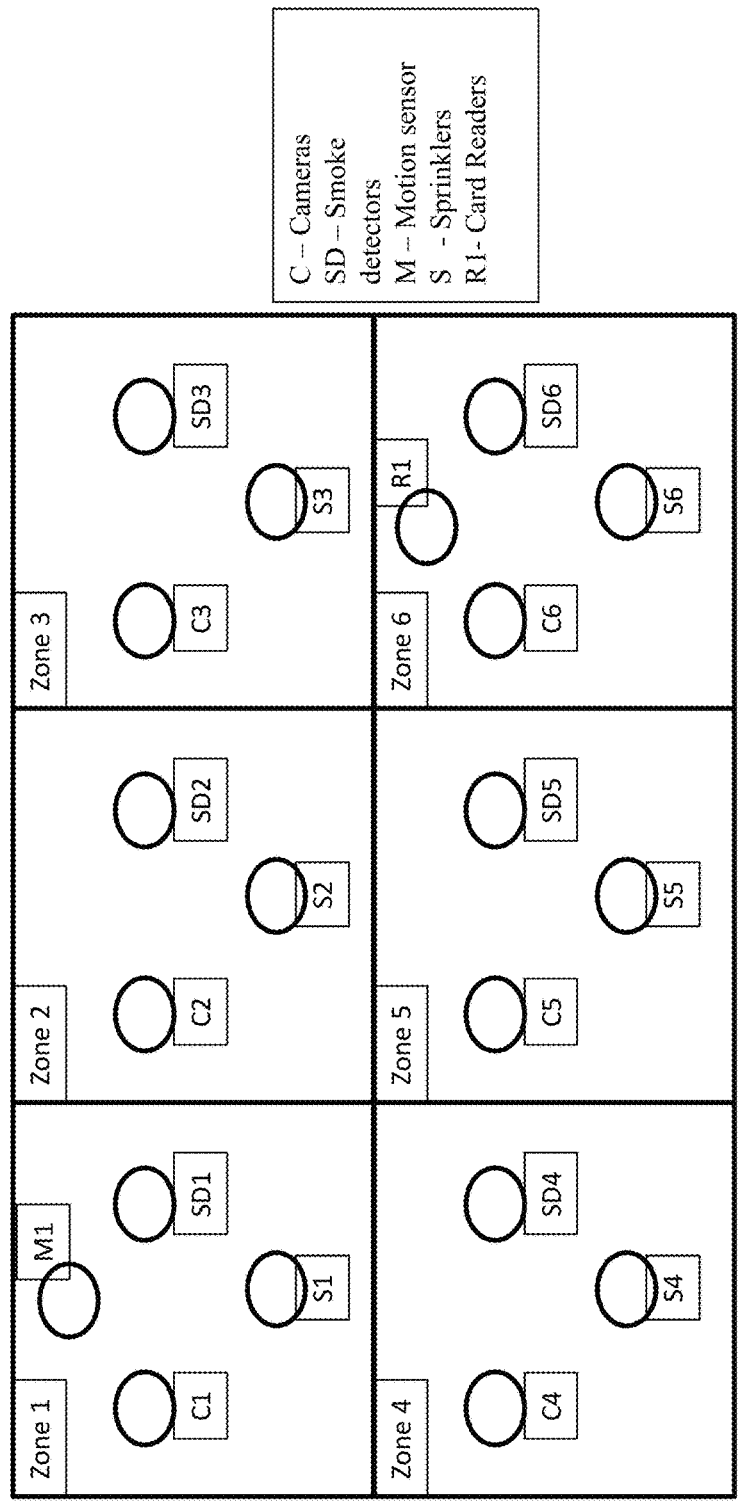
FIG. 12 is a diagram depicting various zones in a built environment during 3D device mapping process.

Referring now to FIG. 12, a representation where in the mapped space may be divided into various zones (Zone 1 through Zone 6) based on the spatial proximities of the various installed devices of interest cameras C1-C6; smoke detectors SD1-SD6; motion sensor M1; sprinklers S1-S6; and card reader R1, and their functional or performance characteristics (an example could be the field of view of cameras) is shown. For example for Zone 1 the video camera C1 within the zone may store or communicate a video clip corresponding to the alarm events generated by smoke detector SD1 or motion sensor M1, whereas in Zone 6 video camera C6 can record activity at card reader R1, etc.

Figure 13:
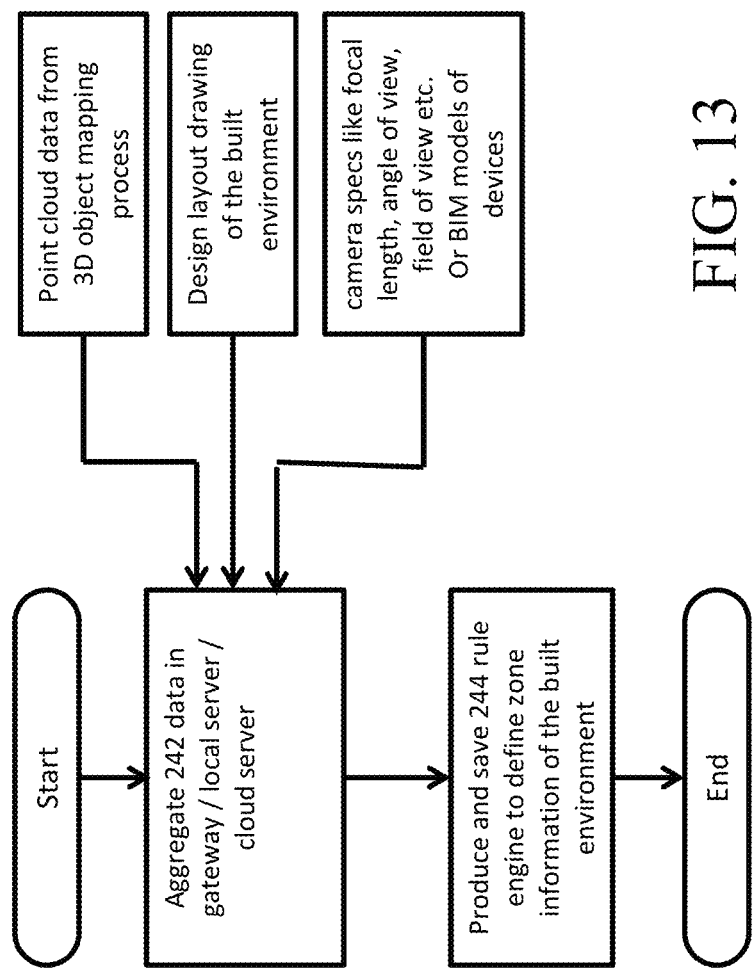
FIG. 13 is a diagram depicting a rule engine to define various zones in a built environment during 3D device mapping process.

Referring now to FIG. 13, a process 240 to define various zones in a built environment during 3D device mapping process is shown. Rules may be learned to produce the association of a specific video camera to a specific sensor based on the spatial relations for instance. The process 240 aggregates 242 data in gateway/local server/cloud server using the data from the device mapping process, 40 a physical drawing of the built environment, and building information modelling data (BIM) of installed devices of interest, which may contain the device performance characteristics. The process 240 produces and saves 244 rule to define zone information of the built environment. Such an approach of automatic learning rules from the representation of built environment overcomes limitations of manually producing the rules. The rules learned may be deployed on rule engines provisioned in either the gateways or local server or cloud server.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Servers include one or more processing devices (e.g., microprocessors), a network interface and a memory (all not illustrated). The monitoring server may physically take the form of a rack mounted card and may be in communication with one or more operator terminals (not shown). The processor of each server acts as a controller and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each server of a central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A system for indoor mapping and navigation comprises:
    a reference mobile device including sensors to capture range, depth, and position data with the mobile device including a depth perception unit, a position estimator, a heading estimator, and an inertial measurement unit to process data received by the sensors from an environment, the reference mobile device further including a processor configured to:
    process the captured data to generate a 2D or 3D mapping that is rendered on a display unit;
    execute an object recognition to recognize objects in the environment and to identify, from the recognized objects, types of installed devices of interest in a part of the 2D or 3D device mapping and provide recognized device information; and
    integrate the 3D device mapping in a built environment with the recognized objects in the environment through capturing point cloud data along with 2D image or video frame data of the built environment.

2. The system of claim 1, wherein a 2D or 3D object recognition technique is part of the 3D mapping process.

3. The system of claim 1, wherein the processor is further configured to:
    retrieve reference device models as images, 3D data models, or Building information modelling (BIM) data.

4. The system of claim 1 wherein the processor is further configured to:
    load RGB/RGB-D (three color+one depth) image point cloud data set of a scene;
    choose interest points;
    compute scene feature descriptors;
    compare the scene feature descriptors to descriptors of 3D models retrieved from a database of 3D models; and
    indicate objects recognized in the scene.

5. The system of claim 1, wherein the object recognition is manual object recognition or automatic object recognition.

6. The system of claim 1 wherein the processor is further configured to:
    append the recognized device information along with an associated point cloud location with respect to a common reference point in a device information file, database, or location server; and
    associate the recognized device information along with a Li-Fi data stream if LED is inbuilt in a recognized device and along with the recognized device.

7. The system of claim 1 wherein the processor is further configured to:
    produce a unique identification code for recognized devices using the recognized device information.

8. The system of claim 1 wherein the processor is further configured to:
    map locations of installed devices of interest by:
        determining point cloud location of the installed devices of interest in the built environment;
        accessing scan data of the same built environment; and
        combining the point cloud locations of the installed devices of interest with the scan data to obtain the 3D device mapping of the built environment.

9. The system of claim 1 wherein the processor is further configured to:
    produce a unique identifier for a device with respect to a current 3D mapping using the recognized device information by appending device type information contained in the recognized device information, with a point cloud location and a Li-Fi data stream.

10. The system of claim 1 wherein the processor is further configured to:
    partition the built environment into smaller regions;
    perform 3D mapping for each of the smaller regions; and
    stitch together resulting 3D mappings of the smaller regions with respect to a common reference to provide a complete 3D mapping of the built environment.

11. The system of claim 1, wherein the processor is further configured to:
    test the point cloud data and the 2D images or the video frames to determine that as captured that both 2D data and a 3D point cloud are 1:1 correspondence.

12. The system of claim 1, wherein the processor is further configured to:
    test the point cloud data and the 2D images or the video frames to determine that as captured that both 2D data and a 3D point cloud are 1:1 correspondence, and, when not in correspondence,
    align the 3D point cloud and the 2D images or the video frame for 1:1 correspondence or estimate an offset.

13. The system of claim 1, wherein the processor is further configured to:
    bind an identifier of installed devices of interest to a respective device by associating a logical device object with the identifier to enable application programs to access the device objects through services associated with the objects.

14. The system of claim 1, wherein installed devices of interest are identified manually with an application configured to:
    generate a graphical user interface tool rendered on a display device with a live feed from an RGB camera;

provide a pointer and device type icons in the graphical user interface;
receive a selection of a particular device;
save 3D point cloud data corresponding to the selection of the particular device made with the pointer tool; and
receive an indication of a selected icon that manually associated with the selected device.

15. A method for indoor mapping and navigation, the method comprising:
capturing data by a reference mobile device that includes an RGB imager, a range sensor, a microelectromechanical system sensor, a depth perception unit, a position estimator, a heading estimator, and an inertial measurement unit to capture data from an environment, the reference mobile device including a processor configured to:
process the captured data to generate a 2D or 3D mapping that is rendered on a display unit;
execute an object recognition to recognize objects in the environment and to identify, from the recognized objects, types of installed devices of interest in a part of the 2D or 3D mapping to provide recognized device information; and
integrate the 3D device mapping in a built environment with the recognized objects in the environment through capturing point cloud data along with 2D image or video frame data of the built environment.

16. The method of claim 15 further comprising:
appending the recognized device information along with an associated point cloud location with respect to a common reference point in a device information file, database, or location server; and
associating the recognized device information along with Li-Fi data stream if LED is inbuilt in a recognized device and along with the recognized device.

* * * * *